(12) United States Patent
Hiscox et al.

(10) Patent No.: US 6,264,154 B1
(45) Date of Patent: *Jul. 24, 2001

(54) CONTAINER HOLDER FOR A MOTOR VEHICLE

(75) Inventors: Ian Hiscox, Coventry; Ismet Mehmet Ozozturk, Solihull, both of (GB)

(73) Assignee: Rover Group Limited, Warwick (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,508

(22) Filed: Nov. 9, 1998

(30) Foreign Application Priority Data

Nov. 26, 1997 (GB) .................................................. 9724957

(51) Int. Cl.⁷ ...................................................... A47K 1/08
(52) U.S. Cl. ........................ 248/313; 248/311.2; 224/926; 224/560
(58) Field of Search ................................. 248/313, 311.2, 248/103, 102, 309.1, 316.1, 316.2, 316.3; 224/926, 560, 563, 482, 556

(56) References Cited

U.S. PATENT DOCUMENTS

| | | | | |
|---|---|---|---|---|
| 1,409,650 | * | 3/1922 | Beedham | 248/313 X |
| 3,429,542 | * | 2/1969 | Fagan | 248/313 |
| 4,379,541 | * | 4/1983 | Harkness | 248/313 X |
| 4,606,523 | | 8/1986 | Statz et al. | . |
| 4,951,997 | * | 8/1990 | Kenney | 248/313 X |
| 5,060,899 | | 10/1991 | Lorence et al. | 248/311.2 |
| 5,195,711 | | 3/1993 | Miller et al. | . |
| 5,279,489 | | 1/1994 | Wheelock et al. | . |
| 5,289,962 | | 3/1994 | Tull et al. | 224/273 |
| 5,474,272 | | 12/1995 | Thompson et al. | 248/311.2 |
| 5,505,417 | | 4/1996 | Plocher | . |
| 5,516,016 | | 5/1996 | Anderson et al. | . |
| 5,603,477 | * | 2/1997 | Deutsch | 248/313 X |
| 5,829,726 | | 11/1998 | Withun | 248/311.2 |
| 5,839,710 | | 11/1998 | Hubbard | 248/311.2 |
| 5,839,711 | * | 11/1998 | Bieck et al. | 248/313 |

FOREIGN PATENT DOCUMENTS

| | | |
|---|---|---|
| 247 633 A1 | 7/1987 | (DE) . |
| 91 07 038.4 | 8/1991 | (DE) . |
| 195 27 918 A1 | 1/1997 | (DE) . |
| 196 03 590 C1 | 4/1997 | (DE) . |
| 198 12 389 A1 | 11/1998 | (DE) . |
| 2073010A | 10/1981 | (GB) . |
| 2159784A | 12/1985 | (GB) . |
| 2 326 141 A | 12/1998 | (GB) . |
| 09-70333 | 3/1997 | (JP) . |
| WO84/04072 | 10/1984 | (WO) . |

OTHER PUBLICATIONS

Japanese Abstract No. 1–317839 A, M–946 dated Mar. 7, 1990, vol. 4, No. 121 to Maruden Sangyo K.K.
Japanese Abstract No. 07237482 A dated Sep. 12, 1995 to Nippon Plast Co., Ltd.
Japanese Abstract No. 08216765 A dated Aug. 27, 1996 to Yatsuku KK.

* cited by examiner

Primary Examiner—Ramon O. Ramirez
Assistant Examiner—A. Joseph Wujciak
(74) Attorney, Agent, or Firm—Davis & Bujold, P.L.L.C.

(57) ABSTRACT

A container holder for a motor vehicle is disclosed in which a generally concave recess (14, 114, 214) is provided with two convex portions (16, 116, 216) that in combination with an elastically deformable member (15, 115, 215) provide a three point support system for a cup or can (126, 127). The arrangement providing a support system for supporting containers of differing dimensions.

20 Claims, 5 Drawing Sheets

CONTAINER HOLDER FOR A MOTOR VEHICLE

FIELD OF THE INVENTION

This invention relates to a container holder and in particular to a container holder for the interior of a motor vehicle to hold a can, cup or bottle.

BACKGROUND OF THE INVENTION

It is well known to provide a container holder for a motor vehicle to hold a drinks cup or can during transit so that the driver of the motor vehicle can take refreshment during a long journey.

OBJECTIVE OF THE INVENTION

It is an object of this invention to provide a very simple cost effective container holder that is able to adequately support containers of greatly different size.

SUMMARY OF THE INVENTION

According to the invention there is provided a container holder for a motor vehicle, the holding comprising:

(a) a first member which defines a generally concave recess, said recess including at least one projection configured to abut any container associated with the recess;

(b) a resilient member, said resilient member being secured about the recess to extend across that recess, said recess and said resilient member being configured whereby a container held within the container holder deforms that said resilient member and abuts that said recess through said at least one projection for a range of different container dimensions so that said recess and said resilient member co-operate to releasably hold that said container therebetween.

The projection may form in combination with the recess and the strap a three point support means.

There may be two spaced apart projections within the recess in which case at least one of the projections may be formed by a convex-shaped portion of the recess.

The recess may have two convex portions therein for abutment against a container placed between the resilient member and the wall defining the recess such that the container is supported at three spaced apart positions irrespective of its size.

One of the convex portions may be formed as part of the wall of the recess.

One of the convex portions may be formed by a separate convex-shaped cam member that is attached to the wall of the recess.

The resilient member may be an elastically extensible member in which case it may be made from an elastomeric material or it may be a leaf spring that is bent by insertion of a container in which case it may be made from spring steel.

The holder may further include a support member to support a lower surface of a container placed in the holder.

Advantageously, the recess may be part of a storage box for a motor vehicle.

According to a second aspect of the invention there is provided a container holder for a motor vehicle, the holder comprising a first plate-like member, two spaced apart projections extending outwardly from the plate-like member and an elastically deformable strap to hold a container to be supported by the holder against the projections.

BRIEF INTRODUCTION OF THE DRAWINGS

The invention will now be described by way of example with reference to the accompanying drawings, in which.

DESCRIPTION OF THE INVENTION

Figure 1:
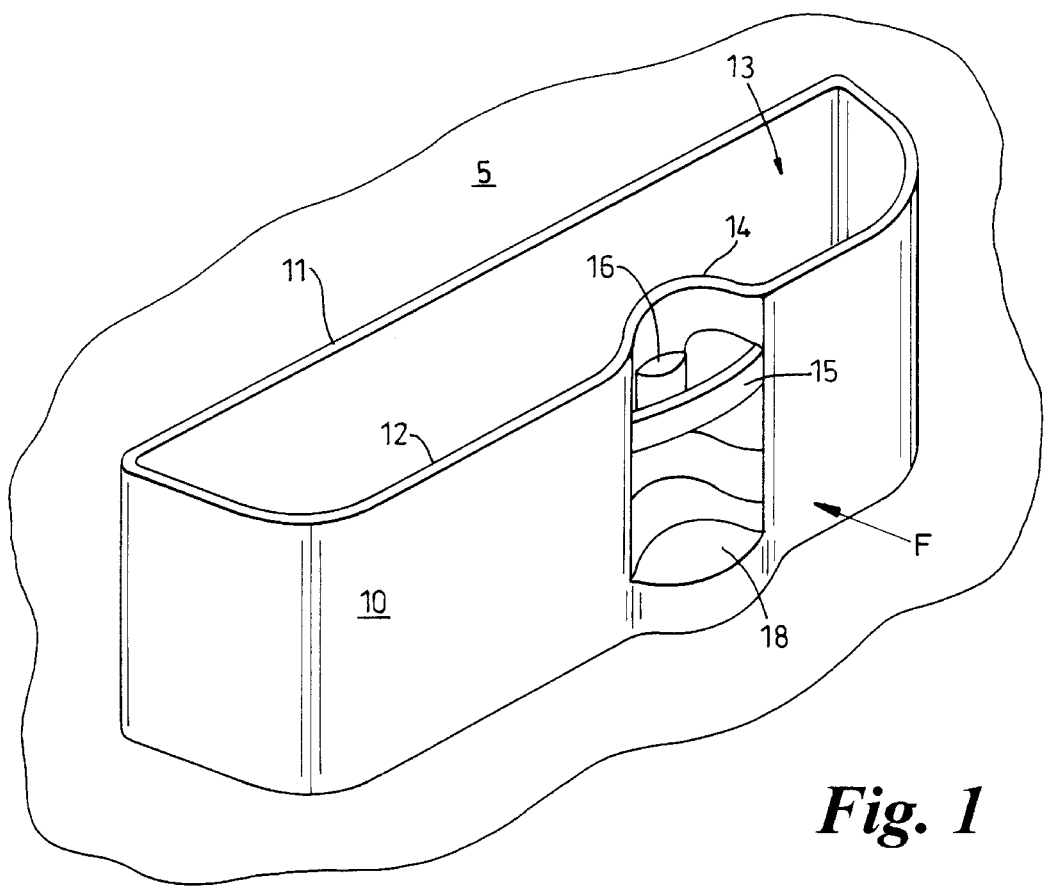
FIG. 1 is a pictorial view of a storage box for a motor vehicle incorporating a container holder according to a first embodiment of this invention.
Figure 2:
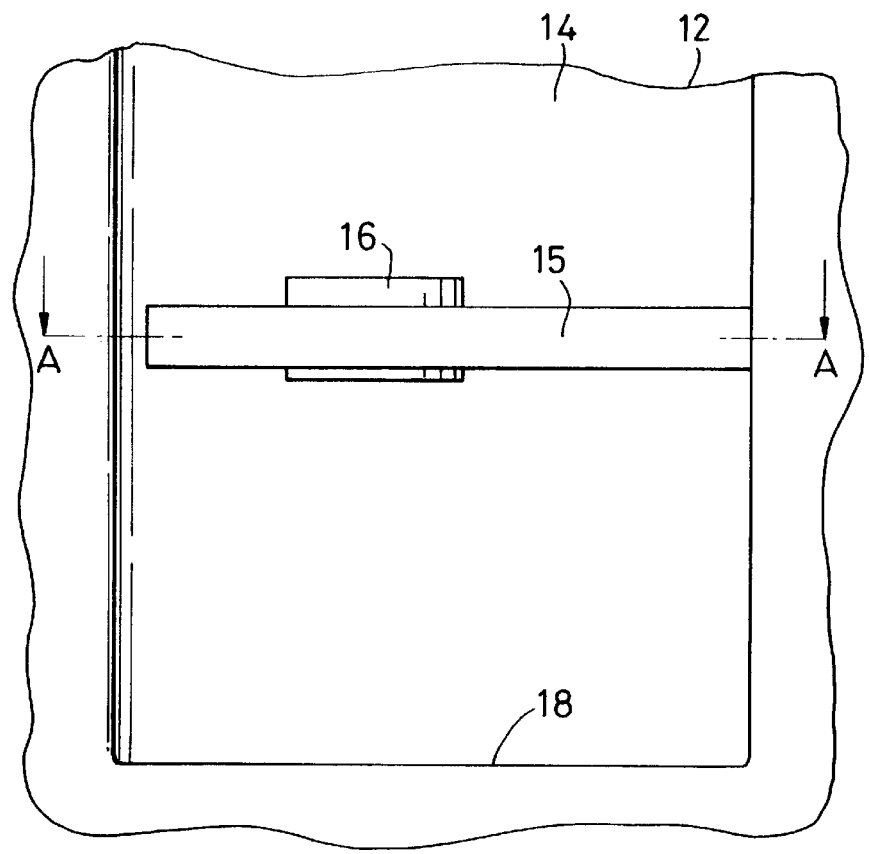
FIG 2 is a view of the container holder shown in FIG. 1 when viewed in the direction of arrow "F"
Figure 3:
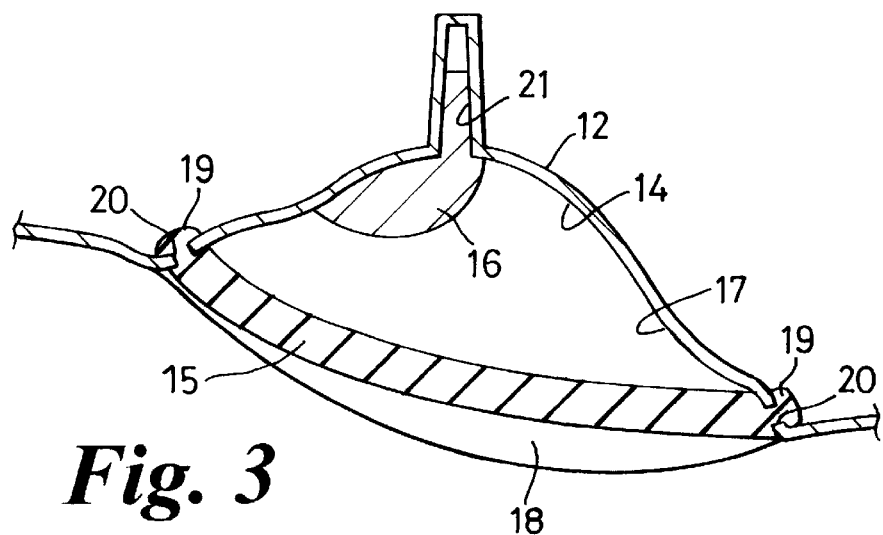
FIG. 3 is a cross-section on the line "A"—"A" in FIG. 2 showing a container holder according to the invention with no container in place.

With reference to the drawing there is shown a storage box 10 having a rear wall 11 and a front wall 12 defining therebetween a cavity 13. The rear wall 11 is attached by means (not shown) to an interior trim panel 5 such as a door panel of a motor vehicle.

The front wall 12 defines a generally concave recess 14 in which a container in the form of a cup or can can be accommodated. The lower end of the recess 14 is bounded by a support member in the form of a ledge 18 which, in use, supports a lower surface of a container supported by the holder.

To retain a container within the recess 14, an elastically extensible member in the form of an elastic strap 15 is positioned across the entrance to the recess 14. The strap 15 is fastened in position at each end by means of a thickened end portion 19 which is engaged with a small aperture 20 in the front wall 12. The recess 14 and the strap 15 define in combination a container holder that is able to securely but releasably hold a drink container such as a cup or can in position during transit of the motor vehicle. The elastic strap is made from an elastically extendible material such as rubber or elastomer.

To accommodate different sized containers the recess 14 has a convex portion 17 formed towards one end of the recess 14 and has a convex-shaped cam member 16 attached to the wall 12 towards the other side of the recess 14. The cam-like member 16 being held in position by engagement with a recess 21 formed in the wall 12.

Figure 4:
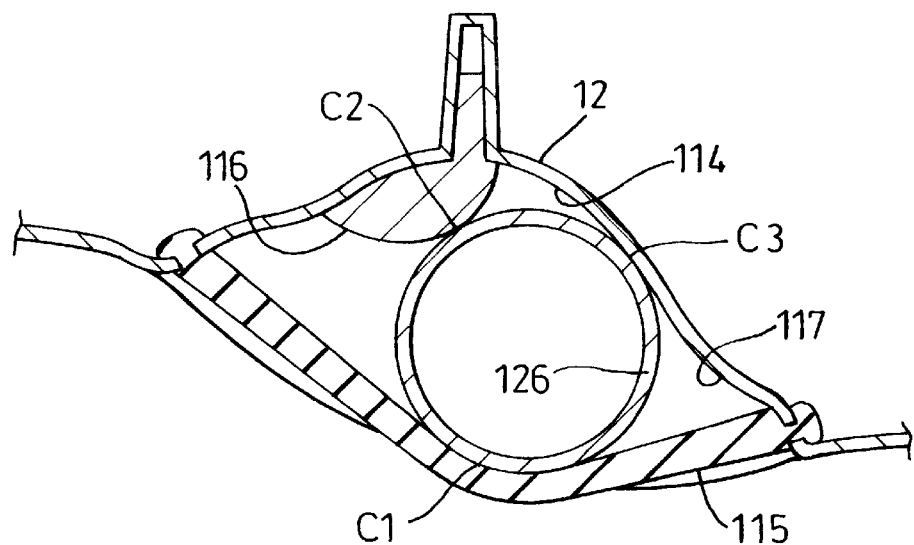
FIG. 4 is a view similar to FIG. 3 showing a small container in place in the container holder.

With particular reference to FIG. 4, it can be seen that when a small cup or can 26 is placed within the container holder it abuts the container holder at three positions. A first position C1 where it abuts the strap 15, a second position C2 where it abuts the cam 116 and a third position C3 where it abuts the convex portion 117 of the recess 114. The can or container 126 is thereby supported at three spaced apart positions and securely held within the container holder.

Figure 5:
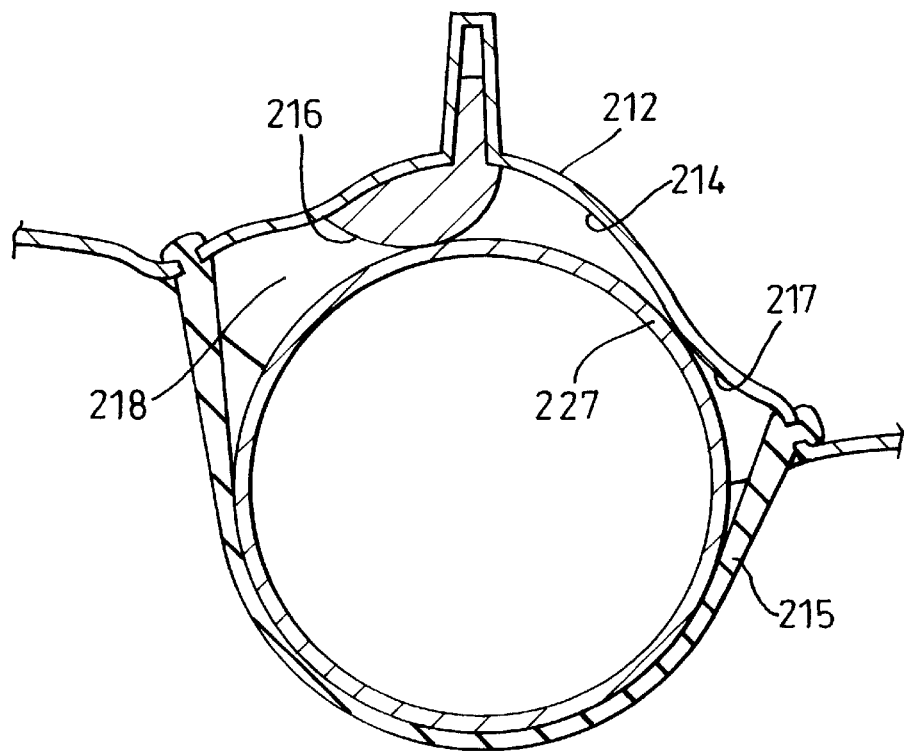
FIG. 5 is a view similar to FIG. 3 showing a large container in place in the container holder.

With reference to FIG. 5, there is shown the same container holder but in this case a very large cup or can 227 is supported by the container holder. In this condition, the strap 215 is extended more than it is in the condition previously described with reference to FIG. 4 but the cup or can 227 is still supported at three spaced apart positions defined by its contact with the strap 215 and its abutment against the cam 216 and the convex portion 217 of the recess 214. Therefore, once again, the cup or can 227 is securely supported by the container holder by a three point contact support system.

The container holder can therefore support in an effective and stable manner containers of greatly varying size and in each case a three point of contact support system is provided. The minimum size of container that can be supported is that which is so small that it barely extends the strap 15 and the largest size container that can be accommodated is that which extends the strap 15 to its fullest extent.

Figure 6:
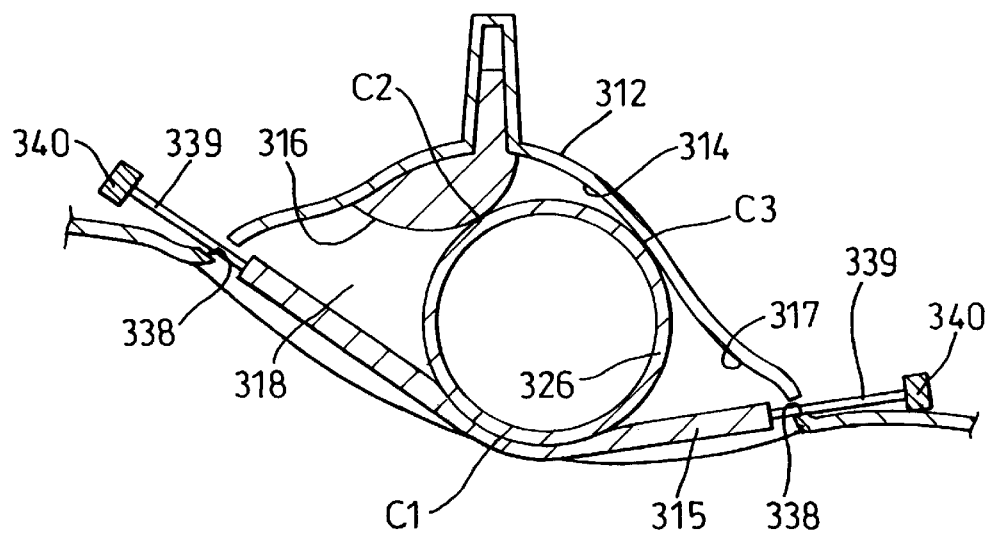
FIG. 6 is a view similar to FIG. 4 but showing a second embodiment of the invention.
Figure 7:
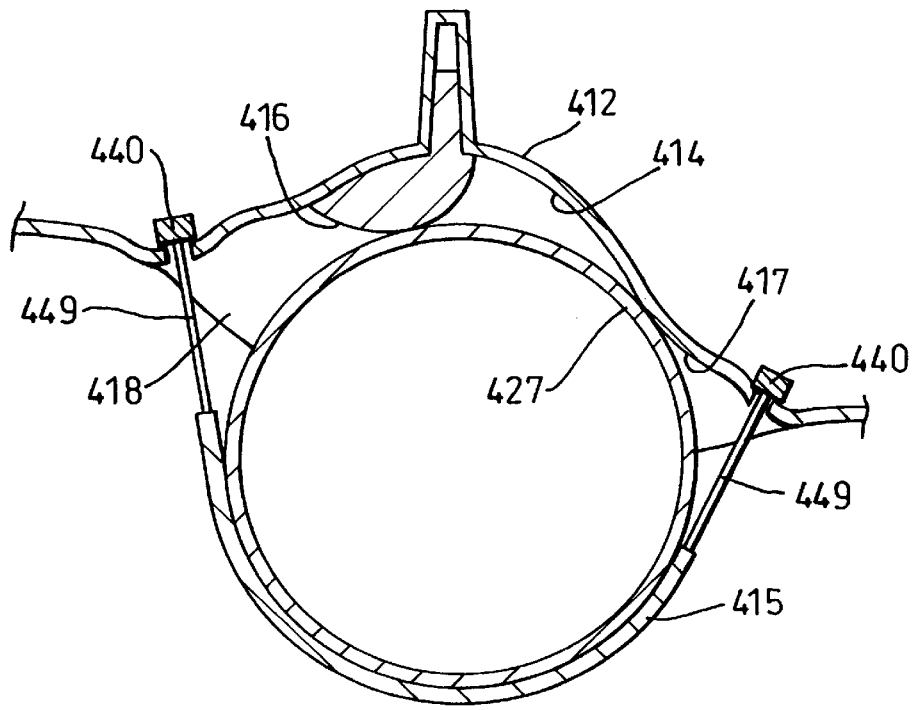
FIG. 7 is a view similar to FIG. 5 but showing a second embodiment of the invention.

With reference to FIGS. 6 and 7 there is shown a second embodiment of the invention. The principal difference between this embodiment and the previously described embodiment is that, in this case, the strap 315, 415 is not elastically extensible but is in the form of a leaf spring 339, 449 made from plastic coated spring steel. When a small container 326 is placed in the recess 314 in the container holder as defined by the front wall 312 so that it rests upon the ledge 318, the strap 315 is bent from its naturally straight shape. This bending causes a reaction force to be produced by the strap 315 biasing the container against the recess 314 and a lug 316 thereby holding it in position. The ends of the straps 315 have thickened end portions 340 in the form of snap on plastic end caps. When a container is placed in the container holder, the strap 315 is pulled out from the front wall 312 through two apertures 338 in the wall 312. The end caps 340 prevent the strap 315 from being pulled completely out of the wall 312.

When in position, the container 326 is held in position by a three point location arrangement having a first contact C1 with the strap 315, a second contact C2 with the lug 316 and a third point of contact C3 with the recess 314. In this way, the container 326 is maintained securely in place.

With reference to FIG. 7, there is shown a container holder as described with reference to FIG. 6 and for which identical parts have been given the same reference numerals with the addition of 100.

In FIG. 7, a large container 427 is shown in position which has caused the strap 415 to be fully extended such that the end caps 440 have contacted a rear side of the wall 412. However, it will be appreciated that even with such a large container in place, the three point location arrangement ensures that the container 427 is held securely in place.

Figure 8:
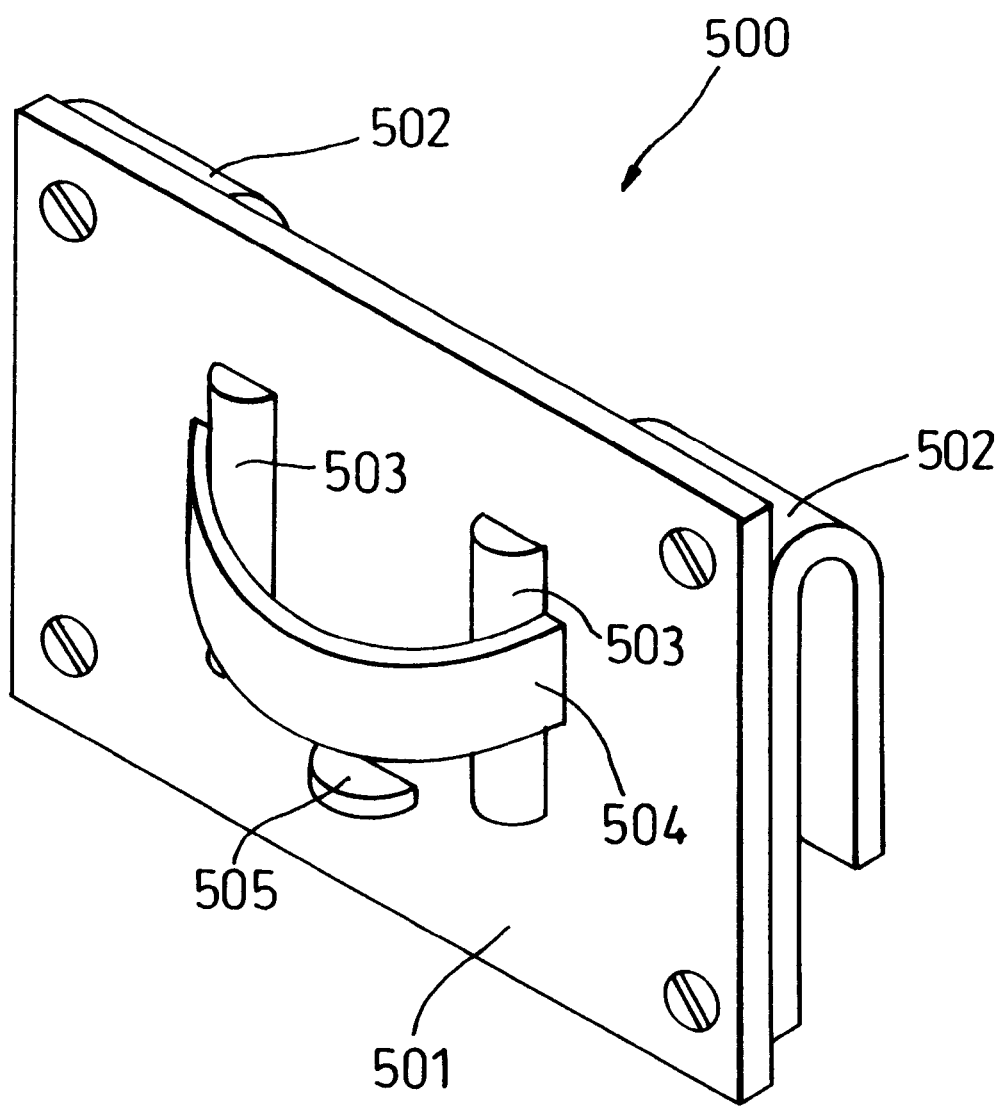
FIG. 8 is a view of a container holder according to a second aspect of the invention.

With reference to FIG. 8, there is shown a container holder 500 having a flat plate member 501 for attachment to part of the interior body structure of a motor vehicle by two clips 502. Two spaced projections 503 extend outwardly from the plate 501 for engagement with a container (not shown) to be held by the holder 500. An elastic strap 504 is connected at both ends to the plate 501. A lower support 505 is provided to support a base of a container (not shown) to be supported by the holder 500.

Upon insertion of a container into the holder 500 the strap 504 is extended to provide a light gripping force against the container and the container rests against three spaced apart supports in the form of the two projections 503 and the strap 504.

Although this invention has been described with particular reference to a cup or can for containing drink, it will be appreciated that other small objects of a similar nature could also be similarly supported.

What we claim is:

1. A container holder for a motor vehicle, the container holder comprising:

a) a first member which defines a generally concave recess, said recess including at least one cam projection configured to present a plurality of different angular engagement surfaces for abutment with a desired container when located within the recess;

b) a resilient member having a first end thereof permanently connected to a first side of the recess and a second end permanently connected to an opposite side of the recess, and the resilient member extending across the recess for retaining a desired container when located within the recess;

said recess and said resilient member being configured such that when a desired container is received within the recess, said resilient member is adapted to be deformed to facilitate accommodation for a range of different dimensioned containers within the recess, whereby the recess, the at least one cam projection and said resilient member cooperate with one another to hold releasably a desired container therebetween.

2. The container holder according to claim 1 wherein said at least one cam projection consists of two spaced apart cam projections located within the recess.

3. The container holder according to claim 2 wherein at least one of the two spaced apart cam projections is formed by a convex shaped portion.

4. The container holder according to claim 3 wherein the convex shaped portion is formed by a cam member supported by an indentation in the wall defining the recess.

5. The container holder according to claim 1 wherein the container holder further includes a support ledge to support a lower surface of a desired container when located within the holder.

6. The container holder according to claim 1 wherein the resilient member is an elastically stretchable member.

7. The container holder according to claim 6 wherein the elastically stretchable member is made from an elastomeric material.

8. The container holder according to claim 1 wherein the resilient member is a leaf spring that is elastically deformed upon insertion of a desired container within the container holder.

9. The container holder according to claim 8, wherein the leaf spring is made from spring steel.

10. The container holder according to claim 1, wherein the recess is formed integral in a front wall of a storage box for a motor vehicle.

11. A container holder for a motor vehicle, the container holder comprising:

a) a first member which defines a generally concave recess, said recess including only first and second convex projections, the first convex projection being located on a first side of the recess and configured to present a plurality of different angular engagement surfaces for abutment with a desired container when located within the recess, and the second convex projection being located on an opposed second side of the recess and configured to present an engagement surface for abutment with a desired container when located within the recess;

b) the recess having a support ledge for supporting a bottom surface of a desired container when located within the recess;

c) a resilient member having a first end thereof permanently connected adjacent the first side of the recess and a second end permanently connected adjacent the second side of the recess, and the resilient member extending across the recess for retaining a desired container when located within the recess;

said recess and said resilient member being configured such that when a desired container is received within the recess, said resilient member is adapted to be deformed whereby a desired container abuts with the first convex projection, the second convex projection and the resilient member such that a desired container is releasably held within the recess by a three point contact support system.

12. The container holder according to claim 11 wherein at least one of the first and second convex projections is formed by a convex shaped portion supported by an indentation in the wall, defining the recess.

13. The container holder according to claim 11 wherein each of the first and second convex projections is formed by a separate convex shaped cam member attached to the wall defining the recess.

14. The container holder according to claim 11 wherein the resilient member is an elastically stretchable member.

15. The container holder according to claim 14 wherein the elastically stretchable member is made from an elastomeric material.

16. The container holder according to claim 11, wherein the resilient member is a leaf spring that is elastically deformed upon insertion of a container within the container holder.

17. The container holder according to claim 16 wherein the leaf spring is made from spring steel.

18. The container holder according to claim 11 wherein the recess is formed integral in a front wall of a storage box for a motor vehicle.

19. A storage box for a motor vehicle, the storage box having a front wall and a rear wall defining a storage cavity therebetween, and an outwardly facing surface of the front wall of the storage box having a container holder formed integrally therewith, the container holder comprising:

a) a generally concave recess being formed in an exterior surface of the front wall, said recess consists of a single convex cam member located on a first side of the recess and configured to present a plurality of different angular engagement surfaces for abutment with a desired container when located within the recess, and said recess further consists of a single convex portion formed in an opposed second side of the recess and configured to present an engagement surface for abutment with a desired container when located within the recess;

b) the recess having a support ledge for supporting a bottom surface of a desired container when located within the recess; and c) a resilient member having a first end thereof permanently connected adjacent the first side of the recess and a second end permanently connected adjacent the second side of the recess, and the resilient member extending across an entrance of the recess for retaining a desired container when located within the recess;

said recess and said resilient member being configured such that when a desired container is located within the recess, said resilient member is adapted to be deformed whereby a desired container abuts with the convex cam member, the convex portion and the resilient member while a bottom wall of a desired container abuts with the support ledge to securely and releasably hold a desired container within the recess by a three point contact support system.

20. The storage box defining a container holder according to claim 19, wherein the resilient member is one of an elastically stretchable member made from an elastomeric material and a leaf spring that is elastically deformed upon insertion of a desired container within the container holder.

* * * * *